US009642117B2

(12) United States Patent
Zhao et al.

(10) Patent No.: US 9,642,117 B2
(45) Date of Patent: May 2, 2017

(54) METHOD OF SELECTING A TRANSMISSION MODE OF A CELL IN AN E_UTRAN SYSTEM

(75) Inventors: Shuang Zhao, Beijing (CN); Guanqing He, Beijing (CN); Bing Jia, Beijing (CN); Honglai Liu, Beijing (CN); Lu Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 359 days.

(21) Appl. No.: 14/370,380

(22) PCT Filed: Jan. 5, 2012

(86) PCT No.: PCT/CN2012/000011
§ 371 (c)(1),
(2), (4) Date: Jul. 2, 2014

(87) PCT Pub. No.: WO2013/102279
PCT Pub. Date: Jul. 11, 2013

(65) Prior Publication Data
US 2014/0341104 A1    Nov. 20, 2014

(51) Int. Cl.
*H04W 72/00* (2009.01)
*H04W 4/06* (2009.01)
*H04W 76/00* (2009.01)
*H04W 48/00* (2009.01)

(52) U.S. Cl.
CPC ........... *H04W 72/005* (2013.01); *H04W 4/06* (2013.01); *H04W 48/00* (2013.01); *H04W 76/002* (2013.01)

(58) Field of Classification Search
CPC ..... H04W 72/005; H04W 4/06; H04W 48/00; H04W 76/002
See application file for complete search history.

(56) References Cited

U.S. PATENT DOCUMENTS

2008/0316952 A1* 12/2008 Gruber ................ H04W 72/005
370/312

FOREIGN PATENT DOCUMENTS

| CN | 101374060 A | 2/2009 |
|---|---|---|
| CN | 101541045 A | 9/2009 |
| CN | 101552949 A | 10/2009 |

(Continued)

OTHER PUBLICATIONS

International Preliminary Report on Patentability, issued in corresponding International Application No. PCT/CN2012/000011, dated Jul. 8, 2014, 5 pages.
(Continued)

*Primary Examiner* — Melvin Marcelo
(74) *Attorney, Agent, or Firm* — Rothwell, Figg, Ernst & Manbeck, P.C.

(57) ABSTRACT

The present invention relates to a method and a network node for selecting transmission mode to a cell providing Multicasting/Broadcasting Multimedia Service, MBMS, which cell is served by the network node in a MBMS single frequency network and comprising at least one user equipment receiving or requesting MBMS data. The network node obtains (601) a first parameter related to a quality of the MBMS experienced by the at least one user equipment and compares Based the first parameter with a predefined first threshold value. Based on the result of comparison the network node selects (604) a transmission mode to the cell.

17 Claims, 9 Drawing Sheets

(56) References Cited

FOREIGN PATENT DOCUMENTS

| CN | 101904194 A | 12/2010 |
|----|-------------|---------|
| EP | 2007151 A1 | 12/2008 |
| EP | 1738520 B1 | 10/2009 |
| WO | 2011030601 A1 | 3/2011 |

OTHER PUBLICATIONS

3GPP, 3rd Generation Partnership Project; Technical Specification Group Radio Access Network; Evolved Universal Terrestrial Radio Access (E-UTRA) and Evolved Universal Terrestrial radio Access Network (E-UTRAN); Overall description; Stage 2 (Release 10), 3GPP TS 36.300, V10.4.0, 2011, 194 pages.
3GPP, 3rd Generation Partnership Project; Technical Specification Group Radio Access Network; Evolved Universal Terrestrial Radio Access Network (E-UTRAN); General aspects and principals for interfaces supporting Multimedia Broadcast Multicast Service (MBMS) with E-UTRAN (Release 10), 3GPP TS 36.440, V10.1.0, 2011, 11 pages.
3GPP, 3rd Generation Partnership Project; Technical Specification Group Services and System Aspects; Multimedia Broadcast/Multicast Service; Stage 1 (Relase 7, 3GPP TS 22.146, V7.1.0, 2006, 18 pages.
European Search Report dated Nov. 6, 2015, issued in European Patent Application No. 12864197.4, 3 pages.
European Communication dated Nov. 13, 2015, issued in European Patent Application No. 12864197.4, 6 pages.

\* cited by examiner

METHOD OF SELECTING A TRANSMISSION MODE OF A CELL IN AN E_UTRAN SYSTEM

CROSS REFERENCE TO RELATED APPLICATION(S)

This application is a 35 U.S.C. §371 National Phase Entry Application from PCT/CN2012/000011, filed Jan. 5, 2012, designating the United States, the disclosure of which is incorporated herein in its entirety by reference.

TECHNICAL FIELD

The present disclosure relates to a method and apparatus for selecting transmission mode of a cell in an Evolved Universal terrestrial Radio Access Network (E-UTRAN) system.

BACKGROUND

Multimedia Broadcast/Multicast Services (MBMS) over wireless networks, such as cellular radio network are becoming widely spread, especially after that mobile handheld devices became capable of receiving multimedia content via radio networks. E-MBMS was introduced in the Release 8 of 3GPP standard for long term evolution (LTE) in order to deliver multimedia data from a single source entity to multiple destinations in LTE. An overview of the MBMS system is given in chapter 15 in the 3GPP technical specification TS 36.300.

While embodiments are described below in relation to Multimedia Broadcast Multicast Service (MBMS) as implemented in LTE, the invention finds application also in other cellular radio networks such as WCDMA, GSM, CDMA etc, but may also be applicable in other type of networks implementing broadcast services. The MBMS that is implemented in LTE and its advance is called Evolved-Multimedia Broadcast Multicast Service (E-MBMS) and is considered as an important component in the LTE architecture.

The MBMS provides two different services: Broadcast and multicast services. The Broadcast service may be received by any subscriber in the area in which the service is offered and multicast services may only be received by users having subscribed to the service and having joined the multicast group associated with the service. Both these services are point to multipoint transmissions of multimedia data and may be highly applied to broadcast text, audio, picture and video to any user located in the service area.

Now, the necessary functions to support E-MBMS in an Evolved Universal Terrestrial Radio Access Network (E-UTRAN) also sometimes referred to as LTE networks are being discussed and defined in the 3GPP standardization body. An important difference compared the MBMS delivery in an Universal Terrestrial Radio Access Network (UTRAN) comes from the distributed nature of E-UTRAN architecture. In E-UTRAN the radio resource management functions, including the scheduling are located in the evolved NodeBs (eNBs), i.e. in the base stations as opposed to UTRAN, Where the radio resource control is located centrally in the Radio Network Controller (RNC). Therefore for MBMS transmission, which may require coordinated and time synchronized transmission from multiple cells, i.e. called Multi Broadcast Single frequency Network (MBSFN) transmission, additional central control entities like the MBMS Control Entity (MCE) have been added to the architecture.

Figure 1:
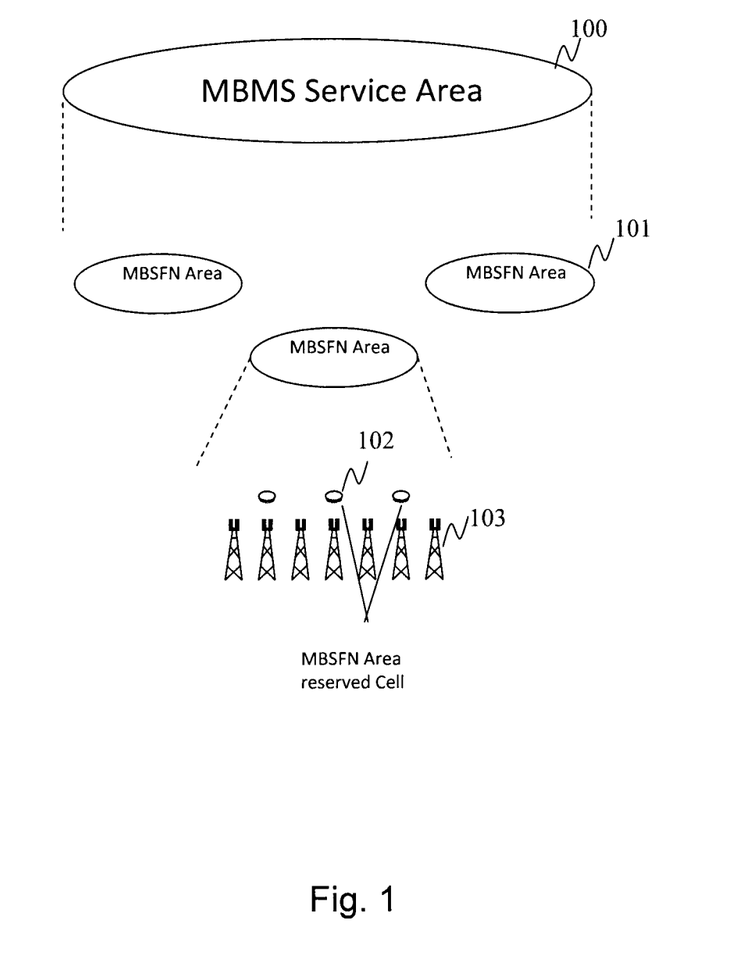
FIG. 1 is a schematic block diagram illustrating embodiments of a wireless communication network.

In FIG. 1 the E-MBMS area concept in the LTE networks is discussed. The area 100 of the network where all eNBs can be synchronized and perform MBSFN transmissions is defined as MBSFN Synchronization Area 100. The MBSFN Synchronization Area 100 consists of a number of MBSFN Areas 101. The MBSFN Area 101 is a group of cells within an MBSFN Synchronization Area of a network, which are coordinated to achieve an MBSFN Transmission. A MBSFN Area Reserved Cell 102 is defined as a cell within a MBSFN Area 101 which does not contribute to the MBSFN Transmission.

Figure 2:
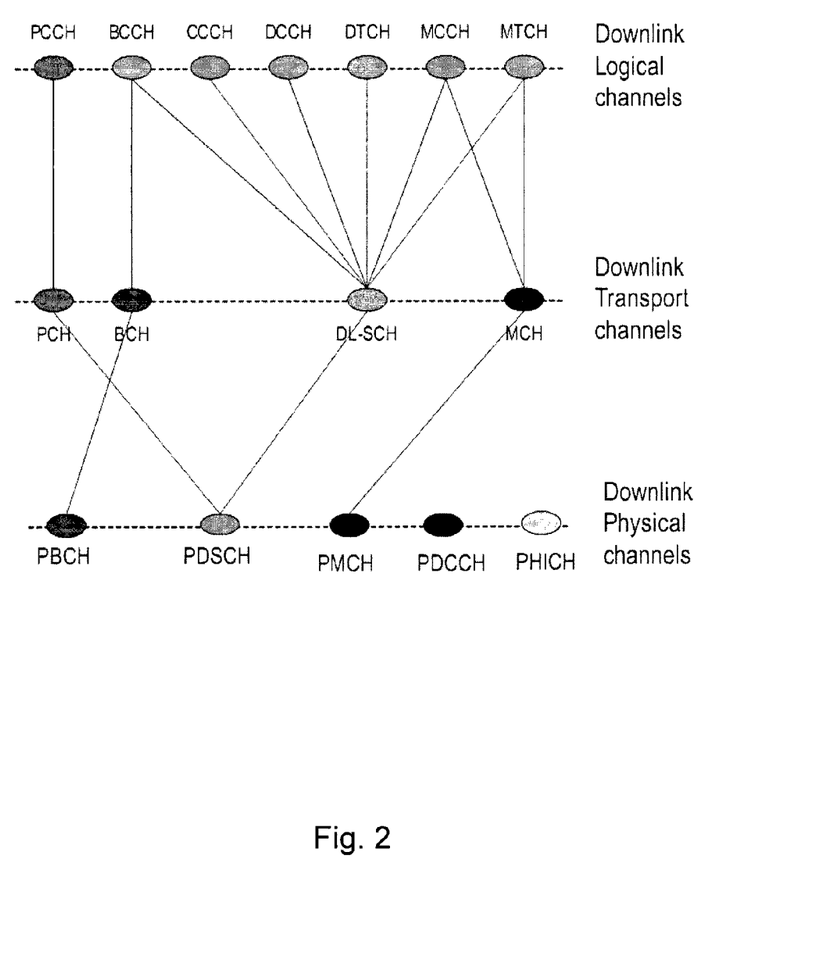
FIG. 2 is a schematic block diagram illustrating embodiments of channel mapping in a wireless communication network.

For the transport of MBMS data over the radio interface two logical channels are introduced into the LTE standard, the MBMS Control channel (MCCH) and the MBMS Traffic Channel (MTCH). The MCCH and MTCH logical channels are mapped onto the MCH transport channel as shown in FIG. 2. Optionally and depending on transmission mode and resource control, it may be possible to map these logical channels to the normal downlink shared channel (DL-SCH) used to deliver the unicast traffic as well. The MTCH channel carries the actual MBMS data while the MCCH carries control information necessary for the reception of the MTCH channel.

Based on the MBMS area definition, the standard defines two main transmission mode of a cell to deliver MBMS content in LTE networks. These are:

Multi-cell transmission: in this transmission mode the same multimedia content is transmitted in multiple cells within an MBSFN Area 101 in a time synchronized fashion, such that the physical signals arriving from different cells at the User Equipment (UE) can be soft combined. Fixed Resource Blocks (RBs) with long cyclic prefix (CP) called MBSFN RBs are assigned to the MBMS service in these cells. The MBMS transmission from the multiple cells is seen as from one source by the UE. In this mode, the MTCH and MCCH are mapped on MCH for a Point to Multipoint (PTM) transmission, and all cells within the MBSFN area, except the MBSFN area reserved cell 102, contribute to the MBSFN transmission.

Single-cell transmission: In this mode the transmission in a cell is targeted only for the user in the given cell. The cell is an MBSFN area reserved cell 102 and there is no coordination of the transmission from multiple cells. In other words, cells in this transmission mode do not take part in any synchronous transmission. The eNB on its own can decide how to allocate radio resource to deliver the MBMS service, i.e. it is able to perform scheduling. In this mode, the MTCH and the MCCH may be transmitted on the DL-SCH or the MCH.

It is today difficult or almost impossible to configure one cell as reserved cell statically, except for those cells which are determined that they will not provide MBMS service to the UEs 302, 405, 406.

If all cells within an MBSFN area 101 are in one transmission mode, the goal to reach an efficient radio resource allocation for all cells is impossible to be fulfilled due to the complexity of the wireless environment and the user service profile. For example in FIG. 3, the serving cell, C31, is working in a multi-cell transmission mode and the UEs 302 receiving MBMS data are located near the base station (eNB) 301 and scarcely receives any MBSFN transmission from neighboring cells. Hence the gain at the UEs 302 of combining signals arriving from neighboring cells taking part in the synchronous transmission is almost zero. Furthermore, under this situation, MBSFN transmission leads to bad spectrum efficiency due to long CP and none of Hybrid Automatic Repeat Request (HARQ), adaptive modulation.

Figure 3:
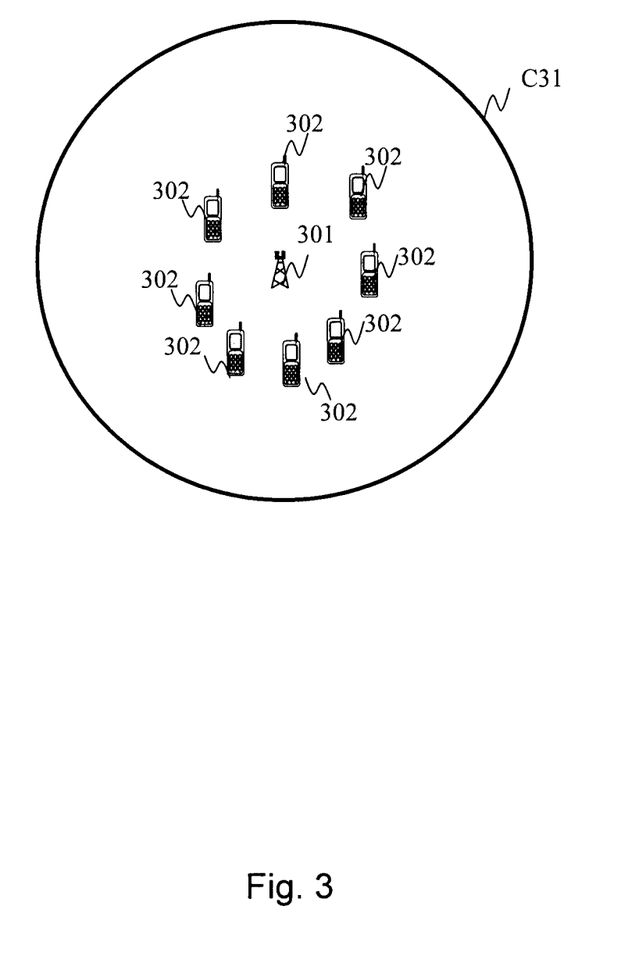
FIG. 3 is a schematic block diagram illustrating embodiments of a wireless communication network.

In other words, as the quality of radio link is good, eNB 301 may provide the same MBMS service with less RBs if the MTCH and the MCCH are mapped to a DL-SCH. Based on the above, it is clear that the serving cell, C31, should have been in a single-cell transmission mode to achieve an efficient radio resource allocation.

Figure 4:
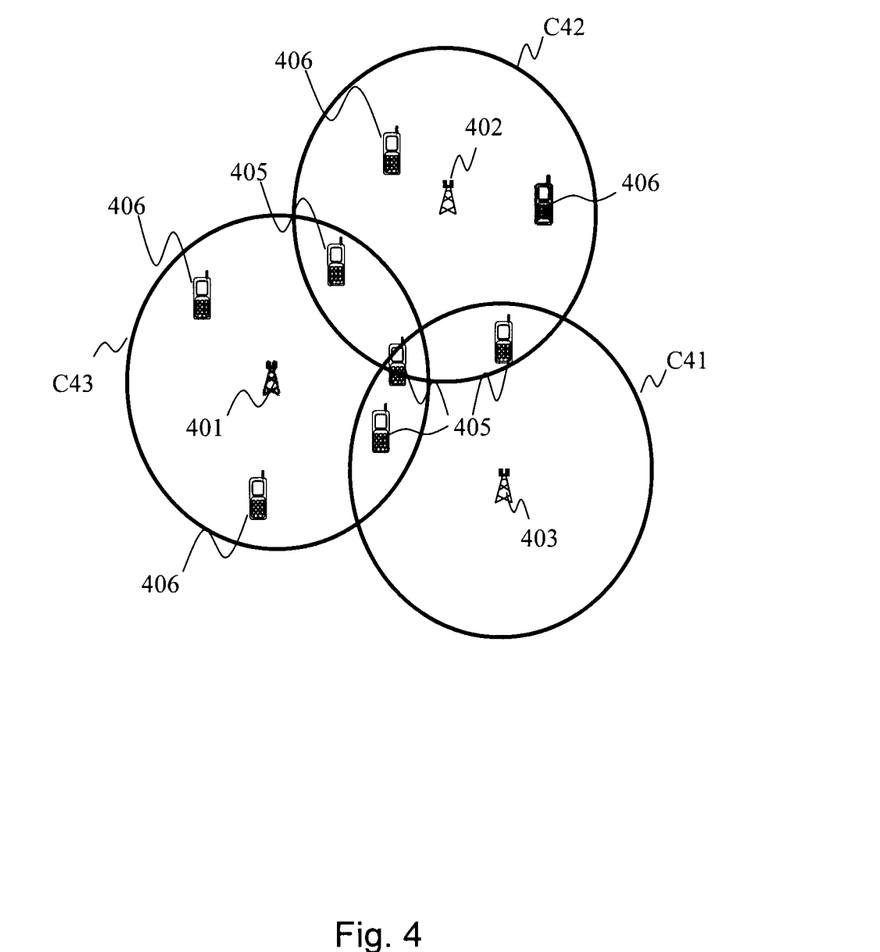
FIG. 4 is a schematic block diagram illustrating embodiments of a wireless communication network.

In another example as shown in FIG. 4, the MBMS transmission is executed from a time-synchronized set of eNBs 401, 402, 403 using the same RBs. This enables over-the-air combining of the signals at the cell edge located UEs 405, 406 thus improving the SINR of MBMS service significantly for those UEs 405, 406 at the cell edge. As shown in FIG. 4, if one cell, C41, only has UEs 405 at cell edge requiring MBMS service, it is very likely that MBMS signals arriving from neighboring cells, C42, C43, are good enough to provide MBMS service for those UEs 405. Consequently, this cell, C41, could efficiently stop multi-cell transmission and use the reserved RBs for MBSFN to perform other services. However existing solutions does not allow switching from one transmission mode to another to achieve an efficient radio resource allocation.

Hence, current MBMS transmission mechanism leads to an inefficient radio resource usage. There is a constant demand to increase the efficiency of a radio system and to utilize existing resources in an optimal way.

SUMMARY

It is the object to obviate at least some of the above disadvantages and provide a mechanism that leads to an inefficient radio resource usage According to a first aspect, the object is achieved by a method in a network node for selecting transmission mode to a cell providing Multicasting/Broadcasting Multimedia Service, MBMS, which cell is served by the network node in a MBMS single frequency network and comprising at least one user equipment receiving or requesting MBMS data. The network node obtains a first parameter related to a quality of the MBMS experienced by the at least one user equipment. The obtained first parameter is further compared with a predefined first threshold value, and the network node selects a transmission mode to the cell based on a result of the comparison.

According to a second aspect, the object is achieved by a network node adapted to select transmission mode to a cell providing Multicasting/Broadcasting Multimedia Service, MBMS, which cell is served by the network node in a MBMS single frequency network and comprising at least one user equipment receiving or requesting MBMS data. The network node comprises obtaining circuit adapted to obtain a first parameter related to a quality of the MBMS experienced by the at least one user equipment. The network node further comprises a comparing circuit adapted to compare the first parameter with a predefined first threshold value. The network node further comprises a selecting circuit adapted to select a transmission mode to the cell based on a result of the comparison.

Since the network node selects a transmission mode based on the wireless environment and user service profile the radio resource usage is efficiently improved.

An advantage according to one embodiment is that based on efficient radio resource usage for MBMS, more RB could be used for other data services, and consequently the cell throughput and network performance are obviously improved.

A further advantage according to another embodiment is that the MBMS capacity is increased and the service quality is improved.

BRIEF DESCRIPTION OF THE DRAWINGS

The invention is described in more detail with reference to attached drawings illustrating exemplary embodiments of the invention and in which.

DETAILED DESCRIPTION OF DIFFERENT ASPECTS OF THE INVENTION

While embodiments are described below in relation to Multimedia Broadcast Multicast Service (MBMS) as implemented in LTE, the invention finds application also in other cellular radio networks such as WCDMA, GSM, CDMA etc, but may also be applicable in other type of networks implementing broadcast services.

Figure 5:
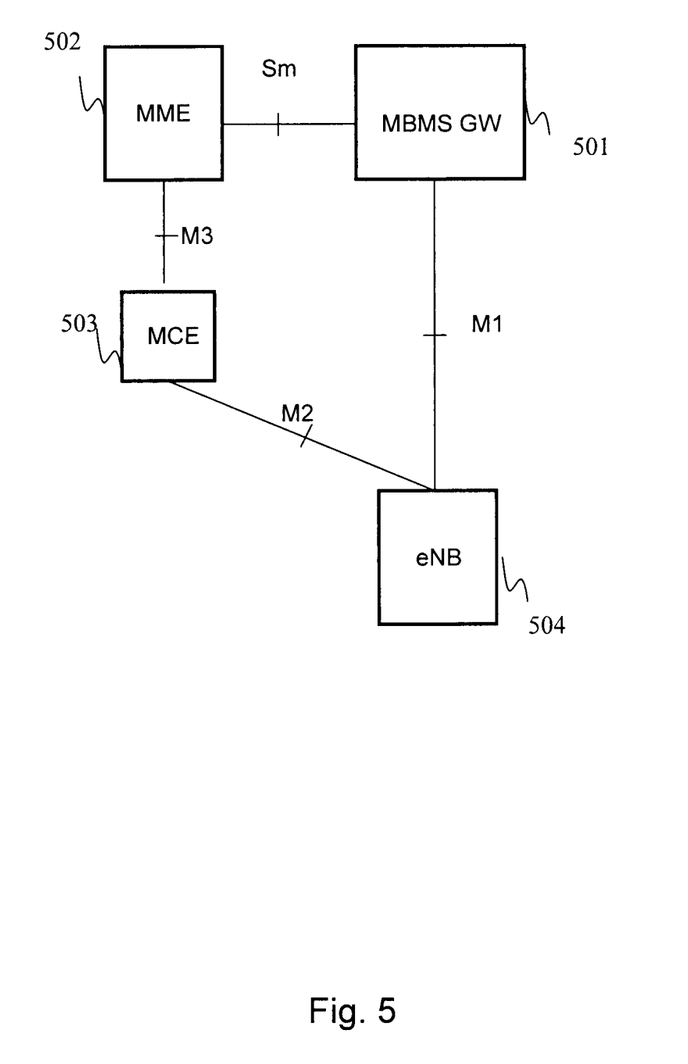
FIG. 5 is a schematic block diagram illustrating embodiments of a wireless communication network.

FIG. 5 depicts a communications system 500 wherein embodiments described in the following disclosure may be implemented. The communications system 500 uses SAE/LTE technology to provide MBMS service. However other technologies may be used such as e.g. WCDMA, GSM/Enhanced Data Rates for GSM Evolution (EDGE) or WiMAX.

The communications system 500 using SAE/LTE technology further comprises a MBMS Gateway (MBMS-GW) 501, a Mobility Management Entity (MME) 502, a Multi-cell/multicast Coordination Entity (MCE) 503 and an enhanced NodeB (eNB) 504. Even though FIG. 5 indicates MCE 503 and eNB 504 as separate entities, they may be combined in a single entity.

The MBMS-GW 501 is the entry point for incoming broadcast/multicast traffic. Its role is to broadcast the multimedia packets to all eNBs within the service area, as well as MBMS session management. It is also in charge for collecting charging information relative to the distributed MBMS traffic for each UE having an active MBMS session.

The MME 502 is the key control-node for the LTE radio access network. It is responsible for idle mode UE tracking and paging procedure including retransmissions. It is involved in the bearer activation/deactivation process and is also responsible for authenticating the user.

The MME 502 and MBMS-GW 501 are connected via the Sm interface as described in 3GPP technical specification TS 23.246.

The MCE 503 is a radio resource control entity, which is responsible mainly for coordinated allocation of radio resources over multiple cells in case of MBSFN transmission mode, ensuring that the same resource blocks are used across the whole MBSFN area for a given service. The MCE is a logical node which may be integrated as part of the eNB 604.

When a new session is about to start, the MBMS GW 501 sends control plane messages to the MME 502 containing information regarding the service, such as Quality of Service (QoS) profile. The QoS profile comprises, amongst other things the Maximum Bit Rate (MBR) and the Guaranteed Bit Rate (GBR) for the service in the MBMS Service Area. This message is the MBMS Session Start Request as specified in the 3GPP technical specification TS 29.274, section 7.13.1. The MME 502 signals to the MCE 503 over the M3 interface that a new session is to be started using the MBMS Session Start Request message, this message is describe in 3GPP TS 36.444. The MCE controls a Multimedia Broadcast multicast service Single Frequency Network (MBSFN) area, normally consisting of cells belonging to several eNBs 504.

The above mentioned entities may incorporate further functions according to the supported service.

The present solution method in a network node 504 for selecting transmission mode to a cell C31, C41, C42, C43 providing MBMS service, which cell 31, C41, C42, C43 is served by the network node 504 in a MBMS single frequency network and comprising at least one user equipment 302, 405, 406 receiving or requesting MBMS data. According to some embodiments, the method will now be described with reference to the flowchart depicted in FIG. 6. The network node 504 may when used in LTE/SAE system be an eNB 504, or any other appropriate node being able to perform transmission mode selections for a cell, such as the MCE 503. The method comprises the following steps, which steps may as well be carried out in another suitable order than described below:

Step 601

Figure 6:
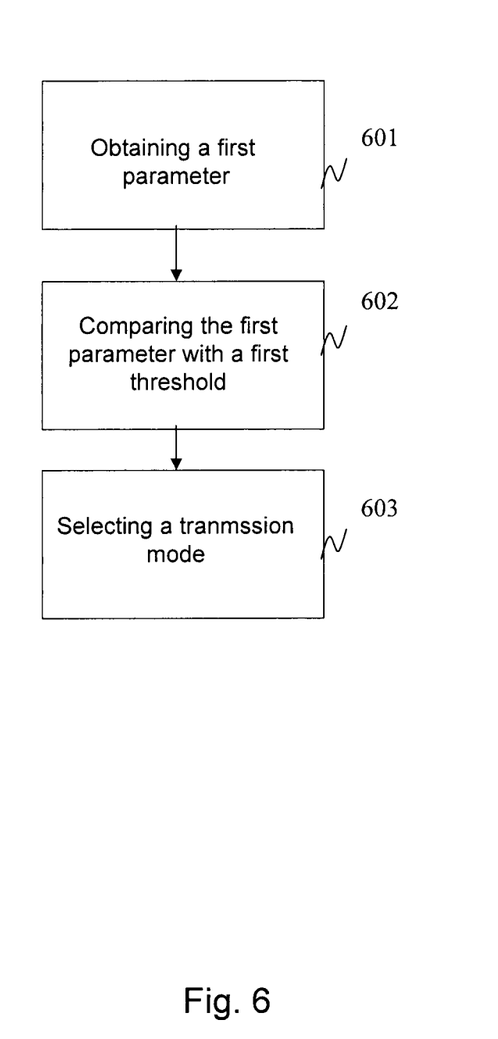
FIG. 6 is a flowchart depicting embodiments of a method in a network node.

The network node 504 obtains a first parameter related to a quality of the MBMS experienced by the at least one user equipment 302, 405 406.

In some of the embodiments this step comprises receiving from the at least one user equipment at least one second parameter related to a quality of the MBMS experienced by the at least one user equipment 302, 405 406, and determining the first parameter based on the received at least one second parameter.

In some of the embodiments this step may be performed after that the network node 504, i.e. the eNB, configures all UE 302, 405, 406 receiving or requesting MBMS data to measure and to report back the reference signal received quality (RSRQ) for the MBSFN Resource Blocks (MBSFN RBs) of neighboring cells, as the at least one second parameter and the first parameter is determined as the minimum of the received RSRQs, denoted P_mbsfn. The configuration may be performed by transmitting an information element (IE) in a message, e.g. MeasConfig in RRCConnectionReconfiguration message, to all UE 302, 405, 406 receiving or requesting MBMS data within the "serving" cell C31, C41, C42, C43. The reporting of the measurement may be performed in a condition that the measurement result exceeds a predefined threshold value (T_p_mbms), e.g. a threshold value that indicates that the RSRQ level is good enough to provide current MBMS Service.

In some of the embodiments this step may be performed after that the network node 504, i.e. the eNB, configures all UE 302, 405, 406 receiving or requesting MBMS data within the "serving" cell to measure and to report back the Channel Quality Indication (CQI) of the MBSFN RBs of the "serving" cell as well as the RSRQ for the MBSFN RBs of neighboring cells, and the first parameter is determined as the minimum of the received RSRQs, denoted P_mbsfn. This configuration may be performed by transmitting an information element (IE) in a message, e.g. CQI-Report-Config in the RRCConnectionReconfiguration message, to all UE 302, 405, 406 receiving or requesting MBMS data within the cell C31, C41, C42, C43. If no RSRQ is received at the network node 504, the CQI is to be considered as the at least one second parameter and the first parameter is determined as the minimum rate, denoted R_cqi, indicated by the at least second parameter, e.g. CQI, subtracted from a fixed rate indicated by at least one fifth parameter, and denoted R_mbms. The fifth parameter may be a fixed rate determined by the MCE based on E-MBMS service profile and forwarded to the network node 504.

Step 602

The network node 504 compares the first parameter with a predefined first threshold value.

In some of the embodiments where the network node 504 had received at least one RSRQ measurements for the MBSFN Resource Blocks (MBSFN RBs) of neighboring cells, this step may be performed by comparing P_mbsfn as the first parameter with T_p_mbms as a predefined first threshold value.

In some of the embodiments where the network node 504 had not received a single RSRQ measurements for the MBSFN Resource Blocks (MBSFN RBs) of neighboring cells, this step may be performed by comparing R_cqi substracted from R_mbms (R-cqi–R_ mbms) as the first parameter with a predefined first threshold value (T_r_cqi) indicating whether R-cqi–R_mbms is big enough to adopt single transmission mode. The T_ r_ cqi is a default value which either is configured in the network node 504 or provided to the network node 504 by the OSS system of the operator.

Step 603

The network node 504 selects a transmission mode to the cell C31, C41, C42, C43 based on a result of the comparison.

In some of the embodiment illustrated in table 1 below, when the number of the received second parameter at the network node 504 is equal to the number of the UEs 302, 405, 406 receiving or requesting MBMS data within the cell C31, C41, C42, C43 and when the first parameter, e.g. P_mbsfn, exceeds the predefined first threshold value, e.g. T_p_mbms, this step is performed by selecting single cell transmission mode to the "serving" cell C31, C41, C42, C43 without allocating transport channel for UEs 302, 405, 406 receiving or requesting MBMS data within the cell C31, C41, C42, C43. In other words, if all UEs 302, 405, 406 receiving or requesting MBMS data within the "serving" cell 302, 405, 406 are able to receive MBMS data from MBMS RBs of neighboring cells with adequate quality, the transmission of MBMS data within "serving" cell C31, C41, C42, C43 should be switched off.

In some of the embodiments illustrated in table 1 below, the network node 504 selects a multi-cell transmission mode to the "serving" cell C31, C41, C42, C43 when the first parameter, R-cqi–R_mbms, is less than the predefined first threshold value, e.g. T_r_cqi, and a transport channel, e.g. MCH, is allocated. In other words, If some or all UEs 302, 405, 406 receiving or requesting MBMS data within the "serving" cell C31, C41, C42, C43 are not able to receive MBMS data from MBMS RBs of neighboring cells with adequate quality nor from MBMS RBs of the "serving" cell, then the transmission mode of the "serving" cell C31, C41, C42, C43 is selected as Multi-cell transmission mode and the MBMS data is transmitted in a time synchronized fashion permitting the UEs 302, 405, 406 receiving or requesting MBMS data within the "serving" cell 302, 405, 406 to soft combine the physical signals.

In some of the embodiments illustrated in table 1 below, the network node 504 selects a single-cell transmission mode to the cell C31, C41, C42, C43 when the first parameter, R-cqi–R_mbms, exceeds the predefined first threshold value, e.g. T_r_cqi, and a transport channel, e.g. MCH or DL-SCH, is allocated. In other words, If some or all UEs 302, 405, 406 receiving or requesting MBMS data within the "serving" cell C31, C41, C42, C43 are not able to receive MBMS data from MBMS RBs of neighboring cells with adequate quality but the MBMS RBs of the "serving" cell are good enough, then the transmission mode of the "serving" cell C31, C41, C42, C43 is selected as single-cell transmission mode and the MBMS data is not transmitted in a time synchronized fashion.

TABLE 1

| Condition | Cell status | MBSFN transmission mode | Transport channel |
|---|---|---|---|
| P_mbsfn >T_p_mbms | Reserved cell | Single-cell transmission | Not applicable |
| No RSRQ received and R-cqi – R_mbms < T_r_cqi | MBSFN cell | Multi-cell transmission | MCH |
| No RSRQ received and R-cqi – R_mbms > T_r_cqi | Reserved cell | Single cell transmission | MCH or DL-SCH |

Figure 7:
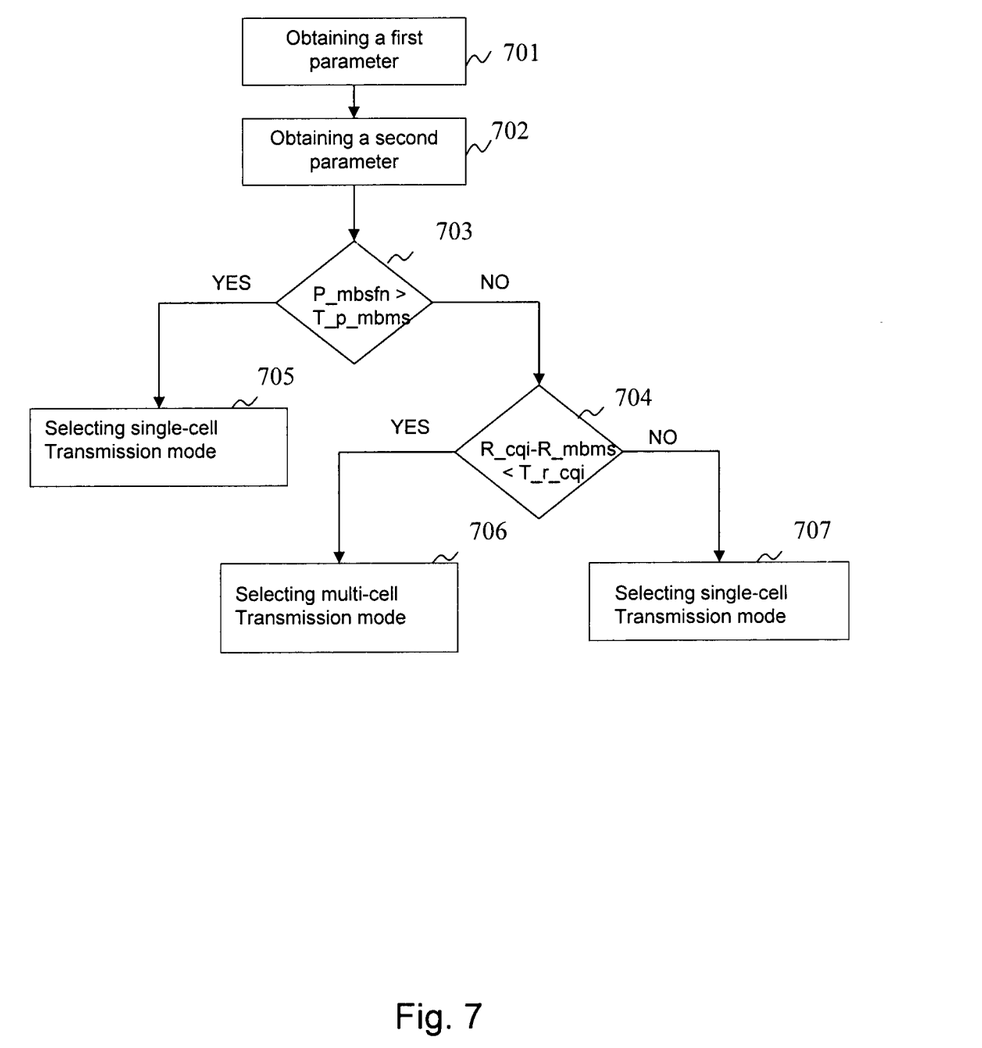
FIG. 7 is a flowchart depicting embodiments of a method in a network node.

The present mechanism in a network node 504 for selecting transmission mode of a cell C31, C41, C42, C43 for MBMS service, according to some embodiments will now be described with reference to the flowchart depicted in FIG. 7. The network node 504 may when used in LTE/SAE system be an eNB 604, or any other appropriate node being able to perform transmission mode selections for a cell C31, C41, C42, C43, such as the MCE 603. The method comprises the following steps, which steps may as well be carried out in another suitable order than described below:

Step 701

The network node 504 obtains a first parameter related to a quality of the MBMS experienced by the at least one user equipment 302, 405 406.

In some of the embodiments this step comprises receiving from the at least one user equipment at least one second parameter related to a quality of the MBMS experienced by the at least one user equipment 302, 405 406, and determining the first parameter based on the received at least one second parameter.

In some of the embodiments this step may be performed after that the network node 504, i.e. the eNB, configures all UEs 302, 405 406 receiving or requesting MBMS data within the "serving" cell C31, C41, C42, C43, to which a transmission is to be selected, to measure and to report back the reference signal received quality (RSRQ) for the MBSFN Resource Blocks (MBSFN RBs) of neighboring cells, as the at least one second parameter. The first parameter is then determined as the minimum of the received RSRQs, and denoted P_mbsfn.

The configuration may be performed by transmitting an information element (IE) in a message, e.g. MeasConfig in RRCConnectionReconfiguration message, to all UE 302, 405 406 receiving or requesting MBMS data within the "serving" cell C31, C41, C42, C43. The reporting of the measurement may be performed in a condition that the measurement result exceeds a threshold (T_p_mbms), e.g. a threshold that indicates that the RSRQ level is good enough to provide current MBMS Service.

Step 702

The network node 504 obtains a third parameter related to a quality of the MBMS experienced by the at least one user equipment 302, 405 406.

In some of the embodiments this step comprises receiving from the at least one user equipment at least one fourth parameter related to a quality of the MBMS experienced by the at least one user equipment 302, 405 406, and determining the third parameter based on the received at least one second parameter.

In some of the embodiments this step may be performed after that the network node 504, i.e. the eNB, configures all UE 302, 405 406 receiving or requesting MBMS data to measure and to report back the Channel Quality Indication (CQI) for the MBSFN RBs of the neighboring cells as the at least one fourth parameter. The third parameter, R_cqi–R_mbms, is determined as the minimum rate, indicated by the at least fourth parameter, denoted R_cqi, subtracted from a fixed rate indicated by at least one fifth parameter, denoted R_mbms. The fifth parameter may be a fixed rate determined by the MCE based on E-MBMS service profile and forwarded to the network node 504.

The configuration may be performed by transmitting information element (IE) in a message, e.g. CQI-ReportConfig in the RRCConnectionReconfiguration message, to all UE receiving or requesting MBMS data within the cell C31, C41, C42, C43.

Step 703

The network node 504 compares the first parameter with a predefined first threshold value.

In some of the embodiments where the network node 504 had received at least one RSRQ measurements for the MBSFN Resource Blocks (MBSFN RBs) of neighboring cells, this step may be performed by comparing P_mbsfn as the first parameter with T_p_mbms as a predefined first threshold value.

Step 704

The network node 504 compares the third parameter with a predefined second threshold value.

In some of the embodiments this step may be performed by comparing R_cqi substracted from R_mbms (R-cqi–R_mbms) as the third parameter with a predefined second threshold value (T_r_cqi) indicating whether R-cqi–R_mbms is big enough to adopt single transmission mode. The T_r_cqi is a default value which either is configured in the network node 504 or provided to the network node 504 by the OSS system of the operator.

Steps 705, 706 and 707

The network node 504 selects a transmission mode to the cell C31, C41, C42, C43 based on the results of comparison.

In some of the embodiment illustrated in table 2 below, when the number of the received second parameter at the network node 504 is equal to the number of the UEs 302, 405, 406 with the MBMS service within the "serving" cell C31, C41, C42, C43 and when the first parameter, e.g. P_mbsfn, exceeds the predefined first threshold value, e.g. T_p_mbms, this step 707 is performed by selecting single cell transmission mode to the "serving" cell C31, C41, C42, C43 without allocating transport channel for UEs 302, 405, 406 using the MBMS service within the "serving" cell C31, C41, C42, C43. In other words, if all UEs 302, 405, 406 receiving or requesting MBMS data within the "serving" cell 302, 405, 406 are able to receive MBMS data from MBMS RBs of neighboring cells with adequate quality, the transmission of MBMS data within "serving" cell C31, C41, C42, C43 should be switched off.

In some of the embodiments illustrated in table 2 below, when the network node 504 receives RCRQ from some but not all UEs 302, 405, 406 receiving or requesting MBMS data within the "serving" cell C31, C41, C42, C43, the network node 504 selects a multi-cell transmission mode to the cell C31, C41, C42, C43 when the first parameter, R-cqi–R_mbms, is less than the predefined first threshold value, e.g. T_r_cqi, and a transport channel, e.g. MCH, is allocated. In other words, If some or all UEs 302, 405, 406 receiving or requesting MBMS data within the "serving" cell C31, C41, C42, C43 are not able to receive MBMS data from MBMS RBs of neighboring cells with adequate quality nor from MBMS RBs of the "serving" cell, then the transmission mode of the "serving" cell C31, C41, C42, C43 is selected as Multi-cell transmission mode and the MBMS data is transmitted in a time synchronized fashion permitting the UEs 302, 405, 406 receiving or requesting MBMS data within the "serving" cell 302, 405, 406 to soft combine the physical signals.

In some of the embodiments illustrated in table 2 below, when the network node 504 receives RCRQ from some but not all UEs 302, 405, 406 receiving or requesting MBMS data within the cell C31, C41, C42, C43 the network node 504 selects a single-cell transmission mode to the cell C31, C41, C42, C43 when the second parameter, R-cqi–R_mbms, exceeds the predefined first threshold value, e.g. T_r_cqi, and a transport channel, e.g. MCH or DL-SCH, is allocated. In other words, If some or all UEs 302, 405, 406 receiving or requesting MBMS data within the "serving" cell C31, C41, C42, C43 are not able to receive MBMS data from MBMS RBs of neighboring cells with adequate quality but the MBMS RBs of the "serving" cell are good enough, then the transmission mode of the "serving" cell C31, C41, C42, C43 is selected as single-cell transmission mode and the MBMS data is not transmitted in a time synchronized fashion.

TABLE 2

| Condition | Cell status | MBSFN transmission mode | Transport channel |
|---|---|---|---|
| P_mbsfn > T_p_mbms | Reserved cell | Single-cell transmission | Not applicable |
| P_mbsfn < T_p_mbms and R_cqi – R_mbms < T_r_cqi | MBSFN cell | Multi-cell transmission | MCH |
| P_mbsfn < T_p_mbms and R_cqi – R_mbms > T_r_cqi | Reserved cell | Single cell transmission | MCH or DL-SCH |

Figure 8:
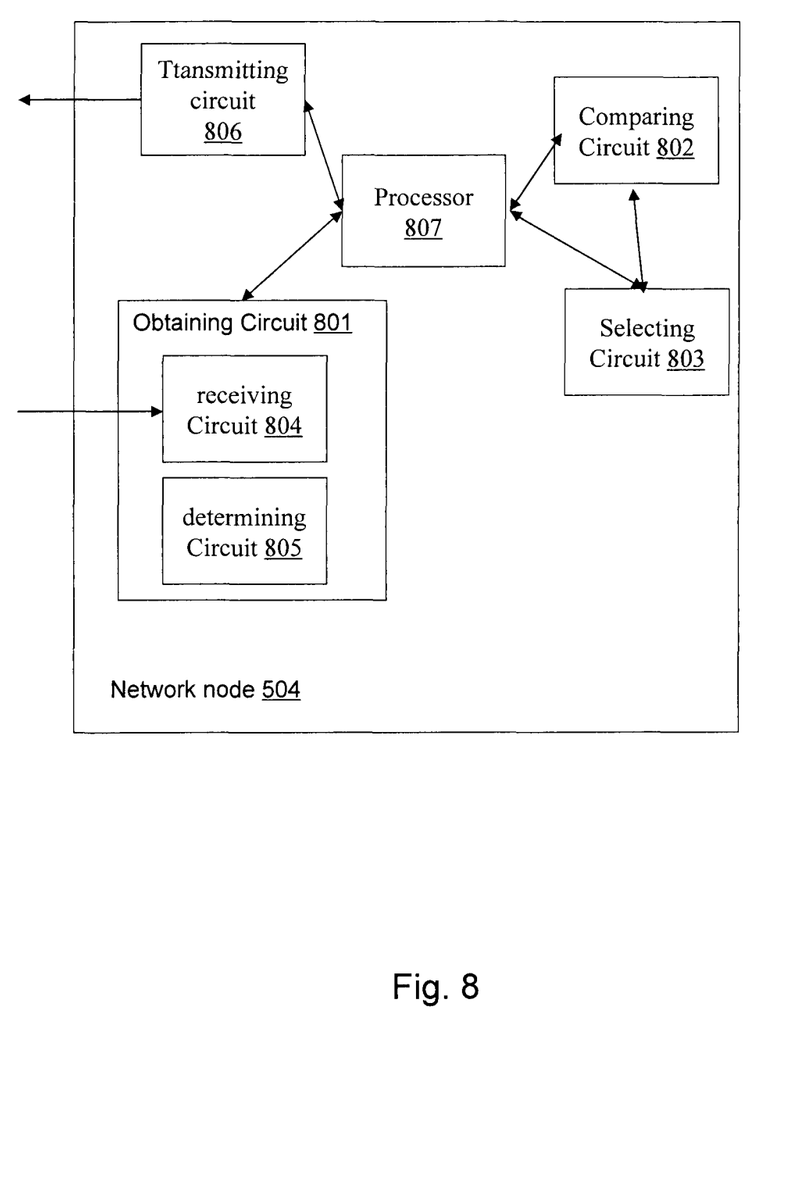
FIG. 8 is a schematic block diagram illustrating embodiments of a network node

To perform the method steps above for selecting a transmission mode for a cell C31, C41, C42, C43, the network node 504 comprises an arrangement depicted in FIG. 8. As mentioned above, the network node 504 is comprised in a MBMS single frequency network.

The network node 504 comprises an obtaining circuit 801 configured to obtain, a first parameter related to a quality of the MBMS experienced by the at least one user equipment 302, 405 406.

In some embodiments the obtaining circuit comprises a receiving circuit 804 configured to receive at least one second parameter from at least one user equipment 302, 405, 406 receiving or requesting MBMS data within the cell C31, C41, C42, C43 and a determining circuit 805 configured to determine a first parameter based on the at least one second parameter.

In some of the embodiments the receiving circuit 804 is configured to receive at least one second parameter from at least one user equipment 302, 405, 406 receiving or requesting MBMS data within the cell C31, C41, C42, C43 after that the network node 504, i.e. the eNB, configures all UE receiving or requesting MBMS data to measure and to report back the reference signal received quality (RSRQ) for the MBSFN Resource Blocks (MBSFN RBs) of the neighboring cells, as the at least one second parameter. The determining circuit 805 is configured to determine the first parameter as the minimum of the received RSRQs, and denoted P_mbsfn.

The configuration may be performed by configuring a transmitting circuit 806 to transmit an information element (IE) in a message, e.g. MeasConfig in the RRCConnectionReconfiguration message, to all UE receiving or requesting MBMS data within the cell C31, C41, C42, C43.

In some of the embodiments the receiving circuit 804 is configured to receive at least one second parameter from at least one user equipment 302, 405, 406 receiving or requesting MBMS data within the cell C31, C41, C42, C43 after that the network node 504, i.e. the eNB, configures all UE receiving or requesting MBMS data to measure within the cell C31, C41, C42, C43 to report back the Channel Quality Indication (CQI) for the MBSFN RBs of the neighboring cells. The determining circuit 805 is configured to determine the first parameter as the minimum rate, indicated by the at least second parameter, e.g. CQI, denoted R_cqi, subtracted from a fixed rate indicated by at least one fifth parameter, denoted R_mbms. The fifth parameter may be a fixed rate determined by the MCE based on E-MBMS service profile and forwarded to the network node 504. The configuration may be performed by configuring a transmitting circuit 806 to transmit an information element (IE) in a message, e.g. CQI-ReportConfig in the RRCConnectionReconfiguration message, to all UE receiving or requesting MBMS data within the cell C31, C41, C42, C43.

In some of the embodiments the receiving circuit 804 is configured to receive at least one second parameter and at least one fourth parameter from at least one user equipment 302, 405, 406 receiving or requesting MBMS data within the cell C31, C41, C42, C43. In some of the embodiments this step is performed after that the network node 504, i.e. the eNB, configures all UE receiving or requesting MBMS data to measure and to report back the reference signal received quality (RSRQ) and the Channel Quality Indication (CQI) for the MBSFN RBs of the neighboring cells as the at least one second and fourth parameter respectively. The determining circuit 805 is further configured to determine the first parameter and the third parameter based on the at least one second parameter and one fourth parameter respectively. The first parameter is determined as the minimum of the received RSRQs, and denoted P_mbsfn and the third parameter as the minimum rate, indicated by the at least third parameter, e.g. CQI, denoted R_cqi, subtracted from the minimum rate indicated by at least one fifth parameter, denoted R_mbms. The fifth parameter may be a fixed rate determined by the MCE based on E-MBMS service profile and forwarded to the network node 504. The configuration may be performed by transmitting two information elements (IEs) in a message, e.g. MeasConfig and CQI-ReportConfig in RRCConnectionReconfiguration message, to all UE receiving or requesting MBMS data within the cell C31, C41, C42, C43. The reporting of the RSRQ may be performed in a condition that the RSRQ result exceeds a threshold (T_p_mbms), e.g. a threshold that indicates that the RSRQ level is good enough to provide current MBMS Service.

The network node 504 comprises a comparing circuit 802 configured to compare the first parameter with a predefined first threshold value.

In some of the embodiments where the receiving circuit 804 had received at least one RSRQ measurements for the MBSFN Resource Blocks (MBSFN RBs) of neighboring cells, the comparing circuit 803 is configured to compare the P_mbsfn as the first parameter with T_p_mbms as a predefined first threshold value.

In some of the embodiments where the receiving circuit 804 had not received a single RSRQ measurements for the MBSFN Resource Blocks (MBSFN RBs) of neighboring cells, the comparing circuit 803 is configured to compare R_cqi substracted from R_mbms (R-cqi–R_mbms) as the first parameter with a predefined first threshold value (T_r_cqi) indicating whether R-cqi–R_mbms is big enough to adopt single transmission mode. The T_r_cqi is a default value which either is configured and stored in the network node 504 or provided to the network node 504 by the OSS system of the operator.

In some of the embodiments the comparing circuit 802 is further configured to compare the third parameter with a predefined second threshold value. This step may be performed by comparing R_cqi substracted from R_mbms (R-cqi–R_mbms) as the third parameter with a predefined second threshold value (T_r_cqi) indicating whether R-cqi–R_mbms is big enough to adopt single transmission mode.

The network node 504 comprises a selecting circuit 803 configured to select a transmission mode to the cell C31, C41, C42, C43 based on the result of comparison.

In some of the embodiment illustrated in table 1 above, when the number of the received second parameter at the network node 504 is equal to the number of the UEs 302, 405, 406 receiving or requesting MBMS data within the cell C31, C41, C42, C43 and when the first parameter, e.g. P_mbsfn, exceeds the predefined first threshold value, e.g. T_p_mbms, the selecting circuit 804 is configured to select single cell transmission mode to the cell C31, C41, C42, C43 without allocating transport channel for UEs 302, 405, 406 receiving or requesting MBMS data within the cell C31, C41, C42, C43.

In some of the embodiments illustrated in table 1 above, the selecting circuit 803 is configured to select a multi-cell transmission mode to the cell C31, C41, C42, C43 when the first parameter, R-cqi–R_mbms, is less than the predefined first threshold value, e.g. T_r_cqi, and a transport channel, e.g. MCH, is allocated. In some of the embodiments illustrated in table 1 above, the selecting circuit 803 is configured to select a single-cell transmission mode to the cell C31, C41, C42, C43 when the first parameter, R-cqi–R_mbms, exceeds the predefined first threshold value, e.g. T_r_cqi, and a transport channel, e.g. MCH or DL-SCH, is allocated.

In some of the embodiment illustrated in table 2 above, when the number of the received second parameter at the network node 504 is equal to the number of the UEs 302, 405, 406 with the MBMS service within the cell C31, C41, C42, C43 and when the first parameter, e.g. P_mbsfn, exceeds the predefined first threshold value, e.g. T_p_mbms, the selecting circuit 803 is configured to select single cell transmission mode to the cell C31, C41, C42, C43 without allocating transport channel for UEs 302, 405, 406 using the MBMS service within the cell C31, C41, C42, C43.

In some of the embodiments illustrated in table 2 above, when the network node 504 receives RCRQ from some but not all UEs 302, 405, 406 receiving or requesting MBMS data within the cell C31, C41, C42, C43, the selecting circuit 803 is configured to select a multi-cell transmission mode to the cell C31, C41, C42, C43 when the first parameter, R-cqi–R_mbms, is less than the predefined first threshold value, e.g. T_r_cqi, and a transport channel, e.g. MCH, is allocated.

In some of the embodiments illustrated in table 2 above, when the network node 504 receives RCRQ from some but not all UEs 302, 405, 406 receiving or requesting MBMS data within the cell C31, C41, C42, C43, the selecting circuit 803 is configured to select a single-cell transmission mode to the cell C31, C41, C42, C43 when the first parameter, R-cqi–R_mbms, exceeds the predefined first threshold value, e.g. T_r_cqi, and a transport channel, e.g. MCH or DL-SCH, is allocated.

The present mechanism for selecting in a network node 504 a transmission mode for a cell C31, C41, C42, C43 may be implemented through one or more processors, such as a processor 805 in the network node 504 depicted in FIG. 8, together with computer program code for performing the functions of the present solution. The program code mentioned above may also be provided as a computer program product, for instance in the form of a data carrier carrying computer program code for performing the present solution when being loaded into the network node 504. One such carrier may be in the form of a CD ROM disc. It is however feasible with other data carriers such as a memory stick. The computer program code can furthermore be provided as pure program code on a server and downloaded to the network node 504 remotely.

Figure 9:
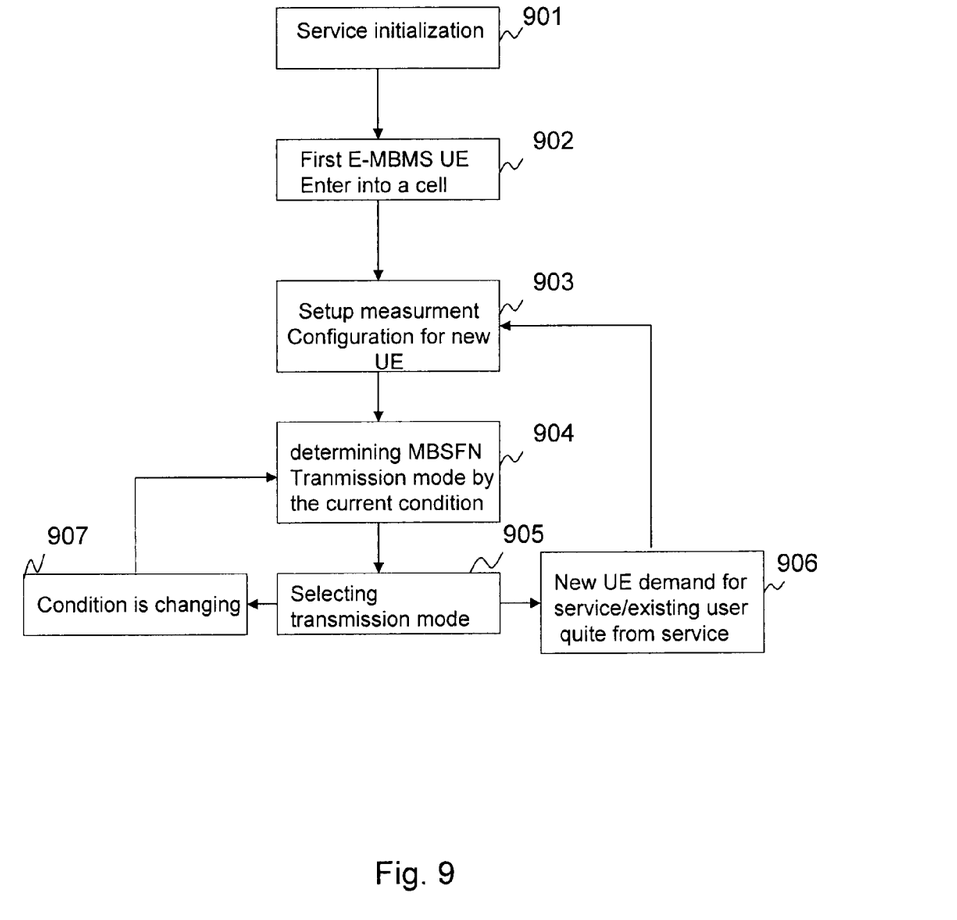
FIG. 9 is a flowchart depicting embodiments of a method in a wireless communication network.

FIG. 9 depicts a flow chart illustrating event triggering the network node 504 to select transmission mode to a cell C31, C41, C42, C43 providing Multicasting/Broadcasting Multimedia Service, MBMS, which cell 31, C41, C42, C43 is served by the network node 504 in a MBMS single frequency network and comprising at least one user equipment 302, 405, 406 receiving or requesting MBMS data. In step 901, a new session is about to start, the MBMS GW 501 sends control plane messages to the MME 502 containing information regarding the service, such as Quality of Service (QoS) profile. The MME 502 signals to the MCE 503 over the M3 interface that a new session is to be started using the MBMS Session Start Request message. The MCE controls a Multimedia Broadcast multicast service Single Frequency Network (MBSFN) area. When, in step 902, a UE 302, 405, 406 requesting MBMS service enters into a cell C31, C41, C42, C43 served by network node 504 belonging to a MBSFN area, the network node 504 configures in step 903 all UEs 302, 405, 406 receiving or requesting MBMS data to measure and report back at least one second parameter and/or a fourth parameter as discussed in s 701, 801 and 803 above. In step 904, the network node 504 determines a transmission mode for the cell C31, C41, C42, C43 serving the newly entered UE 302, 405, 406 as discussed above in connection with FIGS. 7 and 8 and selects in step 905 a transmission mode based on the determining step. If, in step 906 a new UE within the cell C31, C41, C42, C43 requests MBMS service or if an existing UE 302, 405, 406 receiving MBMS data quits from the MBMS Service. The network node 504 iterates to step 903 by configuring all UE 302, 405, 406 receiving MBMS data to measure and report back at least one first parameter and/or a third parameter as discussed in s 701, 801 and 803 above. Based on the received measurements, the network node determines, step 904, and selects, step 905, a transmission mode for the cell C31, C41, C42, C43. If, in step 907, due to the mobility of the UEs 302, 405, 406 the distribution of the UEs 302, 405, 406 receiving MBMS data, has changed within the cell C31, C41, C42, C43, the network node 504 iterates to step 904 and determines a transmission mode for the cell C31, C41, C42, C43 serving the user equipments and selects in step 905 a transmission mode.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for selecting transmission mode to a cell providing Multicasting/Broadcasting Multimedia Service, MBMS, which cell is served by the network node in a MBMS single frequency network and comprising at least one user equipment receiving or requesting MBMS data, the method comprising:
   obtaining a first parameter related to a quality of the MBMS experienced by a user equipment, wherein the obtaining comprises: receiving, from the user equipment, a second parameter indicating whether the user equipment is able to receive MBMS data from MBMS resource blocks (RBs) of one or more neighboring cells with adequate quality, and using the received second parameter to obtain the first parameter;
   comparing the first parameter with a predefined first threshold value; and
   selecting a transmission mode to the cell based on a result of the comparison.

2. The method according to claim 1, wherein the second parameter is a first value that indicates a first reference signal received quality (RSRQ) for Multi Broadcast Single Frequency Network (MBSFN) resource blocks of neighboring cells.

3. The method according to claim 2, wherein
   the obtaining further comprises receiving from a second user equipment a second value that indicates a second RSRQ for MBSFN resource blocks of neighboring cells, and
   using the received second parameter to obtain the first parameter comprises determining whether the first value is less than the second value and selecting the first value as the first parameter as a result of determining that the first value is less than the second value.

4. The method according to claim 3, wherein selecting the transmission mode comprises selecting a single cell transmission mode without allocating transport channel for the user equipment as a result of determining that each UE included in a certain set of UEs has provided information indicating that the UE is able to receive MBMS data from MBMS RBs of neighboring cells with adequate quality.

5. The method according to claim 1, wherein the at least one second parameter indicates channel quality of resource blocks of the MBMS single frequency network.

6. The method according to claim 5, wherein the determining is performed by determining the first parameter as the minimum rate indicated by the at least second parameter subtracted from a fixed rate indicated by at least one fifth parameter.

7. The method according to claim 3, wherein selecting the transmission mode comprises selecting a multi-cell transmission mode as a result of determining that there is at least one UE included in a certain set of UEs that has provided information indicating that the UE is not able to receive MBMS data from MBMS RBs of neighboring cells with adequate quality, wherein the certain set of UEs includes all UEs requesting or receiving MBMS data with a serving cell.

8. The method according to claim 6, wherein selecting a transmission mode is performed by selecting single-cell transmission mode to the cell when the first parameter exceeds the predefined first threshold value and a transport channel is allocated.

9. The method according to claim 1, further comprising:
   obtaining a third parameter related to a quality of the MBMS experienced by the at least one user equipment;
   comparing the third parameter with a predefined second threshold value; and
   wherein the selecting is further performed based on a result of the comparison of the third parameter with the predefined second threshold value.

10. The method according to claim 9, wherein the obtaining comprises receiving from the at least one user equipment at least one fourth parameter related to a quality of the MBMS experienced by the at least one user equipment, and determining the third parameter based on the at least one fourth parameter.

11. The method according to claim 10, wherein the at least one fourth parameter indicates the channel quality of resource blocks of the MBMS single frequency network.

12. The method according to claim 10, wherein the third parameter is the minimum rate of the at least fourth parameter subtracted from a fixed rate indicated by at least one fifth parameter.

13. The method according to claim 9, wherein selecting a transmission mode is performed by selecting multi-cell transmission mode when the first parameter is less than the predefined first threshold value and the third parameter is less than the predefined second threshold value.

14. The method according to claim 13, wherein a multicast channel is allocated as transport channel for the user equipment.

15. The method according to claim 9, wherein selecting a transmission mode is performed by selecting single-cell transmission mode when the first parameter is less than the predefined first threshold value and the third parameter exceeds the predefined second threshold value.

16. The method according to claim 15, wherein one of a multicast channel and a downlink shared channel is allocated as transport channel for the user equipment.

17. A network node in a MBMS single frequency network adapted to select transmission mode to a cell providing Multicasting/Broadcasting Multimedia service, MBMS, and comprising at least one user equipment receiving or requesting MBMS data, the network node comprising:
   an obtaining circuit configured to obtain a first parameter related to a quality of the MBMS experienced by a user equipment, wherein the obtaining comprises: receiving, from the user equipment, a second parameter indicating whether the user equipment is able to receive MBMS data from MBMS resource blocks (RBs) of one or more neighboring cells with adequate quality, and using the received second parameter to obtain the first parameter; and a processor configured to compare the first parameter with a predefined first threshold value and select a transmission mode to the cell based on a result of the comparison.

* * * * *